J. S. CLARK.

Range.

No. 107,876.

Patented Oct. 4, 1870.

WITNESSES:
Thomas Steele
Wm H Morison

INVENTOR:
John S Clark

United States Patent Office.

JOHN S. CLARK, OF PHILADELPHIA, PENNSYLVANIA.

Letters Patent No. 107,876, dated October 4, 1870.

IMPROVEMENT IN RANGES FOR HEATING AND COOKING.

The Schedule referred to in these Letters Patent and making part of the same.

I, JOHN S. CLARK, of the city of Philadelphia, in the State of Pennsylvania, have invented certain Improvements in Ranges for Heating and Cooking, of which the following is a specification.

Nature and Objects of the Invention.

My improvement relates to that class of kitchen-ranges in which the oven is located in an elevated position, with its mouth opening through a face-plate rising vertically from the back edge of the horizontal top plate of the combustion-chamber; and My invention consists in the construction and arrangement of a gradually enlarging upward-draught flue between the combustion-chamber and the horizontal flue under the oven, and corresponding, in width, with the respective widths of the said combustion-chamber and the space containing the oven, the object of my invention being to cause the hot products of combustion, which enter the said up-flue, to expand before they enter the horizontal flue beneath the oven, sufficiently to prevent the front part of the bottom plate of the said oven from becoming too highly heated, or to equalize the heat of the whole bottom plate of the oven, without impairing the strength of the draught along the bottom of the said oven.

Description of the Accompanying Drawing.

Figure 1:
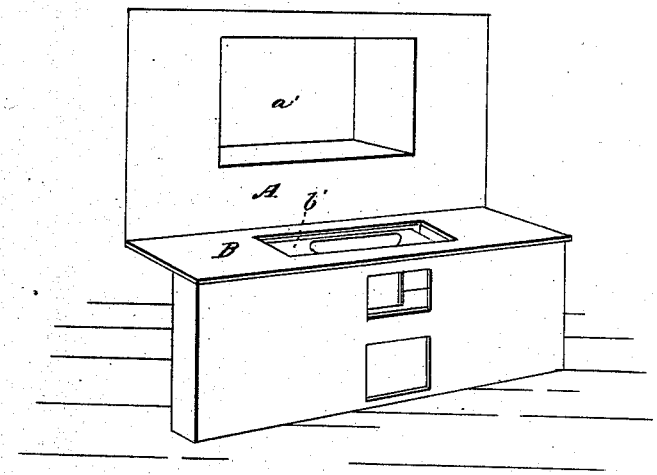
Figure 1 is a perspective view of a range embodying my invention.
Figure 2:
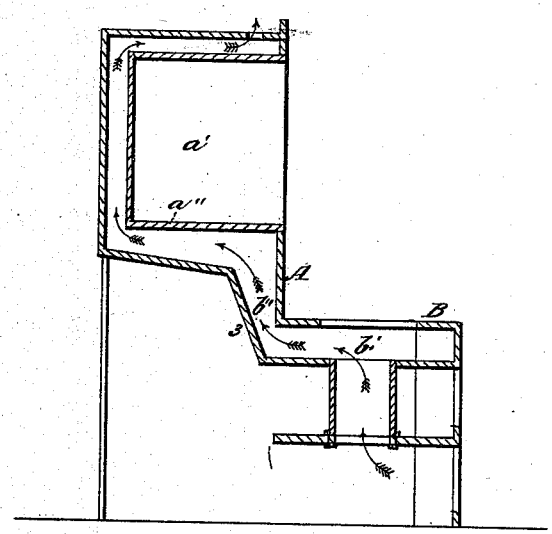
Figure 2 is a vertical transverse section through the middle of fig. 1.

General Description.

A is the front or face-plate of the oven $a'$;
B, the top plate of the combustion-chamber $b'$; and $b''$, the diffusing up-flue, between the bottom plate $a''$ of the oven and the combustion-chamber $b'$.

The face-plate A is made of such a height as to allow the mouth of the oven $a'$ to be sufficiently above the top plate B of the combustion-chamber to permit its usual doors (not shown) to swing clear over the cooking vessels (not shown) which are usually on the said top plate.

The up-flue $b''$ corresponds, in width, with the extreme width of the usual flue under the bottom plate $a''$ of the oven, and the front part, 3, of the bottom of said flue under the oven slopes downward and forward to the bottom of the combustion-chamber $b'$, and, consequently, the hot, gaseous products of combustion will be permitted to spread or become more widely diffused before they impinge against the bottom plate $a''$ of the oven, and the excessive heating of the front part of the said bottom plate be prevented, or the plate heated more equably, and, therefore, in a manner more suitable for baking in the oven, the hot gases passing in the direction of the arrows, and escaping into the chimney, in the usual manner.

Claim.

I claim as my invention—

In a range of the class specified, the gradually enlarging up-flue $b''$, in combination with the combustion-chamber $b'$, and the horizontal flue beneath the elevated oven $a'$, substantially as and for the purpose hereinbefore set forth.

JOHN S. CLARK.

Witnesses:
THOMAS STEELE,
WM. H. MORISON.